United States Patent Office 3,574,592
Patented Apr. 13, 1971

3,574,592
PROCESS FOR PREPARING MICRONUTRIENTS
AND PRODUCTS PRODUCED THEREBY
Harold A. Hartung, West Collingswood, N.J., assignor to
MacAndrews & Forbes Company, Camden, N.J.
No Drawing. Filed June 20, 1969, Ser. No. 835,254
Int. Cl. C05f 11/00
U.S. Cl. 71—1                                36 Claims

ABSTRACT OF THE DISCLOSURE

Trace metal micronutrients, in the form of a soluble complex of the trace metal in the acid soluble portion of an aqueous alkaline licorice root extract, are produced by reacting the aqueous alkaline extract of licorice root with either (a) an acidic trace metal compound or (b) a mineral acid followed by reaction of the resulting acid soluble material with an alkaline or neutral compound of a trace metal, to form the soluble trace metal-licorice root extract complex.

BACKGROUND OF THE INVENTION

It is known that plants require various mineral elements in their diet before they can synthesize the organic constituents needed to stimulate their growth and development. These elements fall into three classifications—primary or major, secondary, and minor or trace elements.

The primary or major elements, also known as macronutrients, include nitrogen, phosphorous, and potassium. The secondary elements include calcium and sulfur. The minor or trace elements, commonly referred to as micronutrients, include the metals zinc, manganese, copper, iron and magnesium.

The primary and secondary elements are generally applied to the soil in which plants are grown in large amounts in the form of highly refined and concentrated raw fertilizer materials. While the use of these highly refined materials is desirable, they do present a problem since, due to their refined nature, most of the trace metals normally present as impurities are no longer part of fertilizer. In addition, the high crop production per acre resulting from the use of the refined fertilizers rapidly depletes the amount of trace metals available in the soil.

It is now, therefore, widely recognized that the addition of trace metals, or micronutrients, to the soil is essential to increase crop production and yield. The specific effect of the micronutrients on the growing crop is not known; however, it has been theorized that the micronutrients act in a catalytic manner in promoting the organic reactions taking place in the plants thereby advancing the maturity of crops and increasing seed production.

Since the micronutrients are required in only small amounts it is difficult to get proper distribution of these elements in the soil. Simple inorganic materials, such as the sulfates and oxides of the trace metals, were originally used as the carriers for the micronutrients. The micronutrients have also been combined with organic compounds in the form of complexes or chelates. These organic micronutrient complexes or chelates are thought to be more readily available to the plant and, therefore, more effective than the inorganic micronutrient compounds. Micronutrients have also been applied to the soil in the form of glass frits containing the micronutrient which are prepared by adding micronutrients to molten glass and grinding the glass after it has hardened. However, the micronutrients are released from the frits very slowly and more rapid contact is needed for meaningful results.

DESCRIPTION OF THE PREFERRED EMBODIMENTS

This invention relates to a process for the production of trace metal micronutrients and more particularly to the production of trace metal micronutrients in the form of complexes or chelates with an extract obtained from licorice root.

It is the object of this invention to provide a source of trace metal micronutrients which when supplied to growing crops will be readily available for utilization by the growing plants. The micronutrient product will be stable, compatible with other products commonly applied to plants, such as fertilizers and foliar sprays, and economical to produce and to use.

According to this invention soluble trace metal micronutrient complexes are prepared by reacting an aqueous alkaline extract of licorice root with a compound of the desired trace metal.

As indicated, the complexing agent utilized in the reaction is obtained from licorice root. The licorice root may be fresh, unextracted root or it may be spent licorice root. Spent licorice root is the solid residue remaining after fresh licorice root has been ground and treated with hot water and steam to remove water soluble material from the root. This aqueous extract is the well-known licorice extract and has been the source of licorice for many years.

To obtain the complexing agent required for this process, the licorice root is treated with an aqueous alkaline solution having a pH of at least 10, preferably a pH of about 10 to 12. The alkali used may be any water-soluble alkaline material providing the stated alkaline conditions, such as sodium hydroxide, potassium hydroxide, ammonium hydroxide, trisodium phosphate and sodium silicate. Of the alkaline materials, the use of a hydroxide is preferred, particularly sodium hydroxide.

The alkaline extraction of the licorice root should be carried out at elevated temperatures of at least 150° F. and preferably under pressure, although the desired extraction will occur at atmospheric pressure if the extraction is carried out for a sufficient period of time with sufficient heat. The extraction is most expeditiously completed under steam pressure, preferably from about 20 to 100 p.s.i.g., especially from about 30 to 50 p.s.i.g.; although pressures up to 200 to 300 p.s.i.g. may be utilized to complete the extraction. The liquor recovered after the alkaline extraction has a pH of about 10 to 12. This alkaline extract of licorice root contains the complexing agent to be combined with the trace metals to form the desired micronutrient products of this invention. The extract may, if desired, be concentrated or even dried.

The alkaline licorice root extract, containing the trace metal complexing or chelating agent, may be combined with a trace metal in either one of two ways. In the presentingly preferred manner, the trace metals recognized as micronutrients, which include zinc, manganese, iron, copper and magnesium are combined directly with the alkaline licorice root extract in the form of acidic salts in which the anion may be, for examle, sulfate or chloride, preferably the sulfate. While the trace elements may be combined with the alkaline licoric root extract as the dry acidic compound, it is preferred that the acidic salt of the metal be in the form of an aqueous dispersion (solution or suspension) when it is mixed with the alkaline licorice root extract.

In the second manner, the alkaline licorice root extract is first treated with a mineral acid such as sulfuric acid and/or hydrochloric acid, preferably sulfuric acid, prior to reaction with the desired alkaline or neutral trace metal compound. It is practical from an economic standpoint, and accordingly preferred that a concentrated mineral acid be used in this treatment, however, the use of a dilute acid would be equally effective. The treatment of the alkaline licorice root extract with the mineral acid should be carried out at elevated temperatures of from about 150° to about 200° F., preferably about 175° F. and at atmospheric (ambient) pressure.

As the result of the acid treatment of the alkaline licorice root extract, an acid soluble complex of the alkaline licorice root extract is formed. This acid soluble complex contains the complexing or chelating component of the alkaline licorice root extract. During the treatment of the alkaline licorice root extract with the mineral acid, a precipitate of the licorice root components insoluble at the acid pH of the mixture is also formed. This precipitate contains the bulk of the alkaline licorice root extract which is not a part of the complexing or chelating component of the licorice root extract. The precipitate can be readily separated from the acid soluble alkaline licorice root extract by simple mechanical means such as filtration. The liquor, containing the complexing or chelating component of the alkaline licorice root extract, has a pH of about 1 or less.

The acid soluble portion of the aqueous alkaline licorice root extract is combined with the trace metals in the form of an alkaline or neutral compound thereof, such as the metal carbonates, oxides or hydroxides. The alkaline or neutral trace metal compound may be combined with the acid soluble alkaline locirice root extract in a dry state, or, as preferred, in the form of an aqueous dispersion (solution or suspension).

The acid soluble complex of the alkaline licorice root extract is a relatively stable material which can be stored for later reaction with the alkaline or neutral trace metal compound to produce a desired trace metal micronutrient. Thus, in production, large amounts of the acid extract of the alkaline licorice root extract can be prepared and stored for later conversion to a particular trace metal micronutrient currently in demand.

Regardless of the method employed, the amount of the trace metal to be combined with the licorice root extract depends primarily upon the concentration of the trace metal necessary in the final product for it to be an effective source of available micronutrient, and secondly, upon the compatibility of the metal complex with other materials, such as fertilizers and foliar sprays, with which they will usually be combined for application. Therefore, in this specification the proportion in which the trace metal compound will be combined with the licorice root extract will be expressed in terms of the amount of the available trace metal in the soluble complex to act as a micronutrient.

The proportion in which the metal compound may be combined with the licorice root extract to provide a soluble complex having a sufficient level of available trace element for use as a plant micronutrient and the property of compatibility with other materials can be determined in advance by the following equation:

$$\frac{A \times B \times C}{D \times E} = X$$

where A=equivalent weight of metal, B=weight percent of licorice root extract in batch, C=percent solids in licorice root extract, D=weight percent of metal compound in batch, E=percent available metal in metal compound, and X=a number ranging from about 20 to about 75. The optimum value of X from the standpoint of compatibility depends upon the particular alkaline material used during extraction. For example, when sodium hydroxide is used, X is generally from about 60 to about 75, preferably from about 65 to about 75.

Generally, from about 50 to about 300 pounds of licorice root extract of about 35–45% solids are combined with 100 pounds of trace metal compound; or, on a dry basis, from about 0.15 to about 1.35 parts, by weight, of licorice root extract solids are combined with 1 part of metal compound.

The reaction between the metal compound and the licorice root extract is preferably carried out at elevated temperatures, although the reaction can be satisfactorily completed at any temperature from room temperature to boiling. It is preferred to carry out the reaction at above about 150° F. because subsequent filtration of the soluble micronutrient complex is more rapid from a hot solution, and because the micronutrient complexes made at elevated temperatures tend to resist degradation on storage better than those made at lower temperatures.

The reaction between the alkaline extract of licorice root and the metal compound produces a soluble metal-licorice root extract complex containing from about 1% to about 30%, by weight, of metal based on the licorice root extract solids. For example, when a zinc-licorice root extract complex is prepared, the complex will contain from about 1 to about 30%, by weight, preferably from about 5 to about 30%, by weight, of zinc. When a manganese-licorice root extract complex is prepared, the complex will contain from about 5 to about 30% manganese, by weight. Likewise, an iron-licorice root extract complex will contain from about 3% to about 24% iron, by weight. When a copper-licorice root extract complex is prepared, the complex will contain from about 3 to about 30% copper, by weight. Similarly, preparation of a magnesium-licorice root extract complex will result in a complex containing from about 1 to about 10% magnesium, by weight.

The pH of the resulting trace metal licorice root extract complex depends upon the trace metal utilized in the reaction. In general, the pH of the resulting trace metal complex ranges from about 2 for the iron complex to about 5 for the zinc and manganese complexes. The pH of the ultimate complex is not a critical factor in the usefulness of these trace metal complexes as micronutrients, however, those complexes with a pH in the range of about 4 to about 5 are particularly desirable for use in acid soils.

The exact reaction which occurs between the trace metal compound and the licorice root extract is not known. In large part, this lack of understanding arises because the active constituent or constituents in the licorice root extract cannot be specifically identified. However, it is theorized that a double decomposition reaction between the metal compound and the licorice root extract complexing agent forms a chelate with the metal, that is, the metal is converted to a less ionizable form than in the original compound. In addition, the acidity of the acid trace metal compound or the mineral acid neutralizes the alkali present in the licorice root extract to form a relatively neutral by-product salt.

The chelating or complexing ability of the licorice root extract, while not fully understood, has been demonstrated by two test procedures. In one procedure, one pound of copper sulfate is mixed with one pound of water at 100° F. The copper sulfate dissolves very slowly with approximately 50% of the copper sulfate remaining undissolved. The addition of one half pound of licorice root extract (extracted using sodium hydroxide) containing 35% solids substantially increases the rate and degree of solubility of the copper sulfate. In comparison, the addition of an amount of water equivalent to that contained in the licorice root extract to the copper sulfate dispersion does not increase the solubility of the copper sulfate to any appreciable degree. In the second procedure, an aqueous solution of 40% zinc sulfate having a pH of 1 is prepared. To one pound of this solution, 0.6 pound of spent licorice root extract (35% solids, using sodium hydroxide for extraction) are added incrementally. The addition of about 10% of this licorice root extract causes the pH of the zinc sulfate solution to rise to about 4 to 5. No further rise in pH is noted as the rest of the licorice root extract is added.

As in the method wherein the alkaline licorice root extract is first treated with mineral acid, during the reaction between the acidic trace metal compound and the licorice root extract a precipitate is formed which contains the components of the licorice root extract not soluble at the final pH of the mixture. It is possible that a minor amount of the metal may be associated with the precipitate, most likely as adhering soluble complex.

The soluble licorice root extract complex of the metal is preferably separated from the acid-insoluble precipitate, preferably by filtration, and is ready for use as a source of micronutrients. The filter cake, since it contains the nonsoluble portions of the same reaction in which the soluble micronutrient complex is formed, and contains adhering soluble micronutrient complex, may also be used as a micronutrient product itself. Of course, the solution containing the soluble complex need not be separated from the precipitate, since the slurry itself could be useful as a source of micronutrients.

After separating the soluble licorice root extract metal complex solution, if this is done, the solution may be polish filtered. The concentration of the finished product may also be adjusted. The concentration of the metal component may be decreased by dilution with water or additional amounts of the licorice root extract or it may be increased by the addition of more metal compound. While it is preferred to utilize the licorice root extract metal complex in its liquid form, it is possible to dry the complex by any suitable means and use it in its dried state.

As a practical matter, and in the preferred embodiment of this invention, the metal compounds are reacted individually with the licorice root extract. Of course, two or more metal compounds could be combined simultaneously with the licorice root extract, although, when combinations of micronutrients are needed, it is preferable to react each metal compound individually with the licorice root extract and then combine the resulting complexed products to produce the desired combined micronutrient product.

This invention may be further explained by the following examples which are given for the purpose of illustration only and should not be interpreted as limiting the scope of this invention.

EXAMPLE I

Preparation of spent licorice root extract

Fresh licorice root is ground and placed in a steam kettle, and is extracted with hot water and steam to remove water soluble material. Then to 8000 lbs. of the resulting wet spent licorice root (made up of 2700 lbs. of dry spent licorice root and 5300 lbs. of water) is added 500 gallons of 6% NaOH (270 lbs. NaOH in 4230 lbs. water). This mixture is heated to 45 p.s.i.g. saturated steam pressure for 4 hours and 6400 lbs. of liquor is recovered. 4800 lbs. of hot water is added to wash the spent root for two hours at 45 p.s.i.g. The root is washed a second time with 1600 lbs. of water for one half hour at 45 p.s.i.g. The washings are added to the first liquor to form a solution containing 4 to 6% dissolved solids. This solution has a pH of 10–12 and can be concentrated or dried.

EXAMPLES II TO VI

In Examples II to VI the trace metal compound is added to the water and heated while mixing and agitating to 100–110° F. The spent licorice root extract, prepared as in Example I, is added to the metal compound dispersion incrementally with continued stirring and heating over a period of from 30 to 60 minutes. The reaction mixture is held until the temperature reaches 160–180° F. when the licorice root extract-metal complex is separated from the precipitated material by filtration.

PREPARATION OF LICORICE ROOT EXTRACT-METAL COMPLEX

| Example | Metal salt [1] | Available metal (Percent) | Metal salt, by weight, in reaction (Percent) | Licorice root extract (35% solids) by weight in reaction (Percent) | Water in reaction by weight [2] (Percent) | Metal in complex | pH resultant complex |
|---|---|---|---|---|---|---|---|
| II | ZnSO$_4$ | 36 | 22 | 48 | 30 | 7–8 | 5 |
| III | MnSO$_4$ | 27 | 31 | 55 | 14 | 7–8 | 5 |
| IV | Fe$_2$(SO$_4$)$_3$ | 23 | 26.5 | 63.5 | 10 | 6–7 | 2.5 |
| V | CuSO$_4$ | 25 | 27.5 | 43 | 29.5 | 6–7 | 4 |
| VI | FeCl$_3$ | 20 | 20 | 72 | 8 | 6–7 | 1.5 |

[1] In the usual commercial form.    [2] Added with metal salt.

EXAMPLE VII

Forty parts, by weight, of solid MgSO$_4$·7H$_2$O is added incrementally, directly to 60 parts, by weight, of spent licorice root extract prepared as in Example I and concentrated to 35% solids and heated for 30 minutes to 160° F. with agitation. The reaction slurry is filtered and the resulting solution contains 4% magnesium.

EXAMPLE VIII

Two hundred grams of licorice root, previously extracted with steam and hot water as in Example I, is extracted with 600 grams of a 10% KOH solution at 200° F. The resulting liquor (270 grams of 12% solids) is combined with a solution of 90 grams of ferric sulfate and a stable complex is formed having a pH of 4 and an iron content of 7%.

EXAMPLE IX 1000 grams of licorice root (weighed on a dry basis), previously extracted with steam and hot water as in Example I, is extracted with 300 cc. of concentrated ammonium hydroxide (29.4% NH$_3$). The mixture is reacted for one hour and 45 minutes at 40 p.s.i.g. steam pressure and the resulting liquor is separated from the root. The remaining root is washed with 500 cc. of hot water and boiled for ½ hour at 40 p.s.i.g. The wash is added to the liquor giving a solution containing 200 grams of solids. This solution is then oven dried and the dried material is then reconstituted with water to 35% solids (with a small amount of ammonium hydroxide to compensate for that lost during drying) and combined with 1.5 times its weight of a 40% zinc sulfate solution and a stable complex is formed having a pH of 5 and a zinc content of about 7%.

EXAMPLE X 600 gms. of licorice root, containing 60% moisture, previously extracted with steam and hot water as in Example I, is extracted with 32 gms. of sodium silicate in 418 gms. of water for 30 minutes at 210° F. The resulting liquor is filtered off and 50 gms. of the liquor is combined with 3 gms. of zinc sulfate and a stable complex is formed having a pH of 4.5 and a zinc content of 2%.

EXAMPLE XI 600 gms. of licorice root, containing 60% moisture, previously extracted with steam and hot water as in Example I, is extracted with 20 gms. of trisodium phosphate in 430 gms. of water for 30 minutes at 210° F. The resulting liquor is filtered off and 50 gms. of the liquor is combined with 3 gms. of zinc sulfate and a stable complex is formed having a pH of 5 and a zinc content of 2%.

EXAMPLE XII 1000 gms. of alkaline licorice root extract, prepared as in Example I, is reacted with 500 gms. of concentrated $H_2SO_4$ for one half hour at 170° F. The resulting mixture is filtered and the filtrate is collected. 100 gms. of filtrate is then reacted with 10 gms. of $Fe_2O_3$ for four hours at 170° F. The resulting mixture is filtered and the liquor collected is a stable complex having a pH of 2 and an iron content of 6%.

EXAMPLE XIII 1000 gms. of alkaline licorice root extract, prepared as in Example I, is reacted with 300 gms. concentrated HCl for one half hour at 170° F. The resulting mixture is filtered and the filtrate is collected. 100 gms. of filtrate is then reacted with 16 gms. of zinc carbonate for one hour at 170° F. The resulting mixture is filtered and the liquor collected is a stable complex having a pH of 5 and a zinc content of 7%.

As stated initially, the licorice root extract-trace metal complexes formed by the reactions just exemplified have great utility as micronutrients. They may, for example, be added to the soil supporting growing crops to exert their beneficial effect. It is likewise possible that they could be utilized, in a proper form, as animal food supplements.

In the preferred embodiments of this invention, however, the micronutrients are used individually or in any combinations of two or more as nutrient supplements for growing crops. The micronutrient solutions are compatible with most typical plant fertilizers and foliar sprays such as fungicides, pesticides, herbicides, etc., and preferably are combined with one or more of these products for economical application.

The routine application of the licorice root extract-metal complexes provides a source of available metal (micronutrient) for the crop in a form which is readily assimilated by the growing plants. In addition, since the nutrient metal is protected by the complex of which it is a part, its premature degradation or loss prior to its assimilation by the plant is avoided.

The following crops respond favorably to the addition of zinc complexed with licorice root extract: corn, potatoes, hops, tomatoes, small grains, sorghum, most vegetables, peaches, pears, apples, peanuts, beans, onions, cotton, sugar beets, rice, wheat, lettuce and other zinc-loving plants.

Similarly, the following crops respond favorably to the addition of iron complexed with licorice root extract: carrots, snap beans, corn, potatoes, flax, squash, celery, lettuce, soybean, citrus crops, turf, milo, sorghum and other iron-loving crops.

Copper, complexed with licorice root extract has a beneficial effect on the following crops: barley, oats, wheat, alfalfa, forage grasses, corn, beans, onions, lettuce, tomatoes, potatoes, cucumbers, watermelons, and other copper-loving crops.

Likewise, manganese complexed with licorice root extract has a beneficial effect on the following crops: corn, potatoes, hops, tomatoes, small grains, sorghum, most vegetables, peaches, pears, apples, peanuts, beans, onions, cotton, sugar beets, rice, wheat, lettuce and other manganese-loving crops.

Certain combinations of these licorice root extract-trace element complexes have been found to be particularly desirable as adjuncts for specific crops. For example, a combination of licorice root extract-trace element complexes containing respectively: 4% zinc, 1% manganese, 1% iron, 1% copper and 4.5% sulfur in the form of sulfate ion, is particularly well suited for addition to corn and potato crops. Similarly, a combination of complexes containing, respectively, 2% zinc, 2% iron and 2% manganese is well suited for addition to soybean, peanut and cotton crops and a combination of complexes containing, respectively, 4% iron, 1% manganese, 1% copper and 1% zinc is well suited for addition to citrus crops and turf. A combination of complexes containing 4% zinc, and 3% iron is well suited for addition to rice crops.

As stated above, economic considerations dictate that the trace metal-licorice root extract complexes be applied to the crops in combination with fertilizers or other substances such as foliar sprays commonly and routinely applied to crops. In this manner the expense of application is almost nil and uniform distribution is assured. For this reason, the micronutrient products prepared according to the teachings of this invention are particularly desirable since they are designed to be compatible with substances normally applied to crops. This means they can be applied, concurrently with fertilizers, etc., with the same equipment used to apply the routine plant additives.

I claim:

1. A process for preparing a soluble trace metal complex for use as a micronutrient which comprises reacting the aqueous alkaline extract of licorice root with (a) an acidic trace metal compound, or (b) a mineral acid and then reacting the resulting acid soluble material with an alkaline or neutral trace metal compound, to form the soluble trace metal complex.

2. A process according to claim 1 wherein the trace metal is zinc, manganese, copper, iron, or magnesium.

3. A process according to claim 1 wherein the acidic trace metal compound is an acidic salt of zinc, manganese, copper, iron or magnesium.

4. A process according to claim 3 wherein the anion of the acidic salt is sulfate or chloride.

5. A process according to claim 1 wherein the alkaline extract of licorice root is prepared by extracting licorice root with an aqueous solution of sodium hydroxide, potassium hydroxide, ammonium hydroxide, trisodium phosphate or sodium silicate.

6. A process according to claim 1 wherein the mineral acid is at least one of the acids selected from the group consisting of sulfuric acid and hydrochloric acid.

7. A process according to claim 1 wherein the alkaline or neutral trace metal compound is a carbonate, oxide or hydroxide.

8. A process for preparing a soluble trace metal complex for use as a micronutrient which comprises reacting the aqueous alkaline extract of licorice root with an acidic trace metal compound.

9. A process according to claim 8 wherein the trace metal is zinc, manganese, copper, iron, or magnesium.

10. A process according to claim 8 wherein the trace metal compound is an acidic salt of zinc, manganese, copper, iron or magnesium.

11. A process according to claim 10 wherein the anion of the acidic salt is sulfate or chloride.

12. A process according to claim 8 wherein the alkaline extract of licorice root is prepared by extracting licorice root with an aqueous solution of sodium hydroxide, potassium hydroxide, ammonium hydroxide, trisodium phosphate or sodium silicate.

13. A process according to claim 8 wherein the reaction takes place at a temperature ranging from room temperature to boiling.

14. A process according to claim 8 wherein the reaction takes place at a temperature of above about 150° F.

15. A process according to claim 8 wherein the soluble trace metal complex is separated from solid material in the reaction mixture.

16. A process for preparing a soluble trace metal complex for use as a micronutrient which comprises treating the aqueous alkaline extract of licorice root with a mineral acid, and reacting the resulting acid soluble complex with an alkaline or neutral trace metal compound.

17. A process according to claim 16 wherein the mineral acid is at least one of the acids selected from the group consisting of sulfuric acid and hydrochloric acid.

18. A process according to claim 16 wherein the trace metal is a zinc, manganese, copper, iron, or magnesium oxide.

19. A process according to claim 16 wherein the alkaline or neutral trace metal compound is a carbonate, oxide or hydroxide.

20. A process according to claim 14 wherein the alkaline extract of licorice root is prepared by extracting licorice root with an aqueous solution of sodium hydroxide, potassium hydroxide, ammonium hydroxide, trisodium phosphate or sodium silicate.

21. A process according to claim 16 wherein the treatment of the alkaline licorice root extract with the mineral acid is carried out at a temperature ranging from about 150 to about 200° F.

22. A process according to claim 21 wherein the treatment takes place at a temperature of about 175° F.

23. A process according to claim 16 wherein the reaction between the acid soluble complex of the alkaline licorice root extract and the alkaline or neutral trace metal salt takes place at a temperature ranging from room temperature to boiling.

24. A process according to claim 23 wherein the reaction takes place at a temperature above about 150° F.

25. A process according to claim 16 wherein the soluble trace metal complex is separated from solid material in the reaction mixture.

26. A micronutrient which comprises a trace metal selected from the group consisting of zinc, manganese, iron, copper, and magnesium complexed with an alkaline extract of licorice root.

27. A micronutrient according to claim 26 wherein said alkali is sodium hydroxide, potassium hydroxide, ammonium hydroxide, trisodium phosphate or sodium metasilicate.

28. A micronutrient according to claim 26 wherein said trace metal is zinc and wherein said zinc-licorice root extract complex contains from about 1 to about 30%, by weight, of zinc based on the solids.

29. A micronutrient according to claim 26 wherein said trace metal is manganese and wherein said manganese-licorice root extract complex contains from about 5 to about 30%, by weight, manganese based on the solids.

30. A micronutrient according to claim 26 wherein said trace metal is iron and wherein said iron-licorice root extract complex contains from about 3 to about 24%, by weight iron based on the solids.

31. A micronutrient according to claim 26 wherein said trace element is copper and wherein said copper-licorice root complex extract contains from about 3 to about 30%, by weight, copper based on the solids.

32. A micronutrient according to claim 26 wherein said trace element is magnesium and wherein said mangesium-licorice root extract complex contains from about 1 to about 10%, by weight, magnesium based on the solids.

33. A micronutrient which comprises a mixture of trace metal-alkaline extract of licorice root complexes said trace metals being zinc, manganese, copper, and iron, wherein said mixture contains about 4%, by weight zinc; 1% by weight manganese; 1%, by weight, iron; and 1% by weight copper.

34. A micronutrient which comprises a mixture of trace metal-alkaline extract of licorice root complexes, said trace elements being zinc, iron and manganese wherein said mixture contains about 2%, by weight, zinc; about 2%, by weight, iron; and about 2% by weight, manganese.

35. A micronutrient which comprises a mixture of trace metal-alkaline extract of licorice root complexes, said trace elements being iron, manganese, copper, and zinc wherein said mixture contains about 4%, by weight, iron; about 1%, by weight, manganese; about 1%, by weight, copper; and about 1%, by weight, zinc.

36. A micronutrient which comprises a mixture of trace metal-alkaline extract of licorice root complexes, said trace elements being zinc and iron, wherein said mixture contains about 4%, by weight, of zinc and about 3%, by weight, of iron.

References Cited

UNITED STATES PATENTS 3,270,003  9/1966  Blamcom et al. _____ 71—1X
3,473,255  10/1969  Working _____ 71—23X REUBEN FRIEDMAN, Primary Examiner R. BARNES, Assistant Examiner U.S. Cl. X.R.
71—23; 260—236.5